United States Patent [19]
Lin

[11] Patent Number: 5,269,922
[45] Date of Patent: Dec. 14, 1993

[54] WATER FILTER

[76] Inventor: Jing-Zhi Lin, 4th Fl., No. 125, Zhi-Guang St., Yong-He City, Taipei, Hsien, Taiwan

[21] Appl. No.: 987,177

[22] Filed: Dec. 8, 1992

[51] Int. Cl.⁵ .................... B01D 24/18; B01D 27/02
[52] U.S. Cl. .................... 210/282; 210/285; 210/286; 210/336; 210/338; 210/342; 210/315; 210/316
[58] Field of Search ............ 210/282, 285, 286, 232, 210/338, 342, 336, 315, 316, 288

[56] References Cited

U.S. PATENT DOCUMENTS

| | | | |
|---|---|---|---|
| 3,374,895 | 3/1968 | Krongos | 210/282 |
| 3,535,235 | 10/1970 | Schouw | 210/282 |
| 5,141,636 | 8/1992 | Flanagan et al. | 210/748 |
| 5,164,082 | 11/1992 | Lin | 210/287 |

FOREIGN PATENT DOCUMENTS 80203471 3/1991 Taiwan .

Primary Examiner—Stanley S. Silverman
Assistant Examiner—Cynthia L. Nessler
Attorney, Agent, or Firm—Jacobson, Price, Holman & Stern

[57] ABSTRACT

The present invention is related to a water filter and particularly to a water filter with a rotary filter tube, comprising a water filter cylinder and a plurality of filter leaf thimbles so that there is a maximum filter course in a certain filter space for water filtering. It is very convenient to replace the filter leaves (thimbles) outside the water inlet pipe (port).

7 Claims, 5 Drawing Sheets

WATER FILTER

BACKGROUND OF THE INVENTION

The filtration of drinking water in general makes use of a water filter cylinder filled with filter material (such as active carbon or ion-exchange resin or other various filter materials) so as to separate and adhere solid impurity in the water.

The drinking water in the water inlet pipe (port) of water filter is filtered through natural or chemical fiber cloth or foaming filtration so as to eliminate larger solid impurity in the water, then enters into the water filter cylinder filled with filter material and small solid impurity is adhered by active carbon or ion-exchange resin or other various filter materials, finally the filtered and clean water is drained from the water outlet pipe (port) for drinking.

In the foregoing course, the larger solid impurity in the drinking water gradually accumulates in a filtration layer of water inlet pipe (port) and the dirt in water tends to block the filtration layer to decrease effectiveness of filtration. Therefore, manufacturers adopt a way of flowing water adversely to flush the filtration layer and eliminate said dirt. One of the examples is Taiwan Application No. 80203471 titled "An Adversely Flushed Water Filter" of Mr. Tzu-Fu Lin.

However, it is very difficult for the flushing force of flowing water adversely to effectively cleanse the dirt adhered to the filtration layer for a long time. It is proved that we have to manually use a brush or a detergent and a sterilizing medicine to forcefully wash and brush the dirt to cleanse a water tower in general, so the filter material of invention of adversely flushed water filter of Mr. Tzu-Fu Lin needs to be replaced after it is actually used for more than six months so as to keep its healthiness.

In the foregoing filtration course of drinking water in general, the water is filtered through the filtration layer in the water inlet pipe (port), then through the filter material in the water filter cylinder which adheres to smaller solid impurity in the water depending on the direction, course and speed of water flowing. The longer the water flow course and the slower the water flow speed, the higher the rate of filter material adhered to the smaller solid impurity in water, and the better the effectiveness of cleansing the drinking water.

SUMMARY OF THE INVENTION

In view of above, the present invention offers a water filter and particularly to a water filter with a rotary filter tube, comprising a water filter cylinder and a plurality of filter leaf thimbles, wherein the water filter cylinder consists of a housing with water inlet and outlet pipes, a rotary filter tube and suitable quantity of active carbon or ion-exchange resin or other filter materials. The water inlet pipe is installed on one side of the housing and the water outlet pipe is installed on another side of the housing. The rotary filter tube consists of a windable and bendable tube body, suitable quantity of filter materials and two filter leaf jackets. The tube body of rotary filter tube is rotatably or bendably wound in the housing and filled with ion-exchange resin or active carbon or other filter materials. Inner edge of two ends of tube body of rotary filter tube is provided with a filter leaf jacket respectively. One end of rotary filter tube is connected to the inner end of water inlet pipe, and another end of rotary filter tube is rotatably extended to the upper or lower end of inner edge of housing. The periphery of rotary filter tube in the housing is filled with active carbon or ion-exchange resin or other filter materials. The outer end of water inlet pipe can be connected to a plurality of filter leaf thimbles so as to keep the filter leaf jackets of rotary filter tube in the water inlet pipe clean.

The larger solid impurity in the drinking water is firstly filtered through a plurality of filter leaf thimbles, and the smaller impurity in the drinking water is fully adhered to the rotary filter tube which extends its filtration flow course, the filtered and clean water flows into the housing, then the water is further purified by the active carbon or ion-exchange resin or other filter materials around the rotary filter tube in the housing, and is filtered by the filter leaf jacket in the water outlet pipe on another side of the housing and drained so that the water filtration has a maximum filter course in a certain filtration space.

DETAILED DESCRIPTION OF THE INVENTION

Other objects and features of the present invention will become apparent from a consideration of the following description which proceeds with reference to the accompanying drawings wherein certain selected embodiments are chosen to illustrate the invention.

First Embodiment

Figure 1:
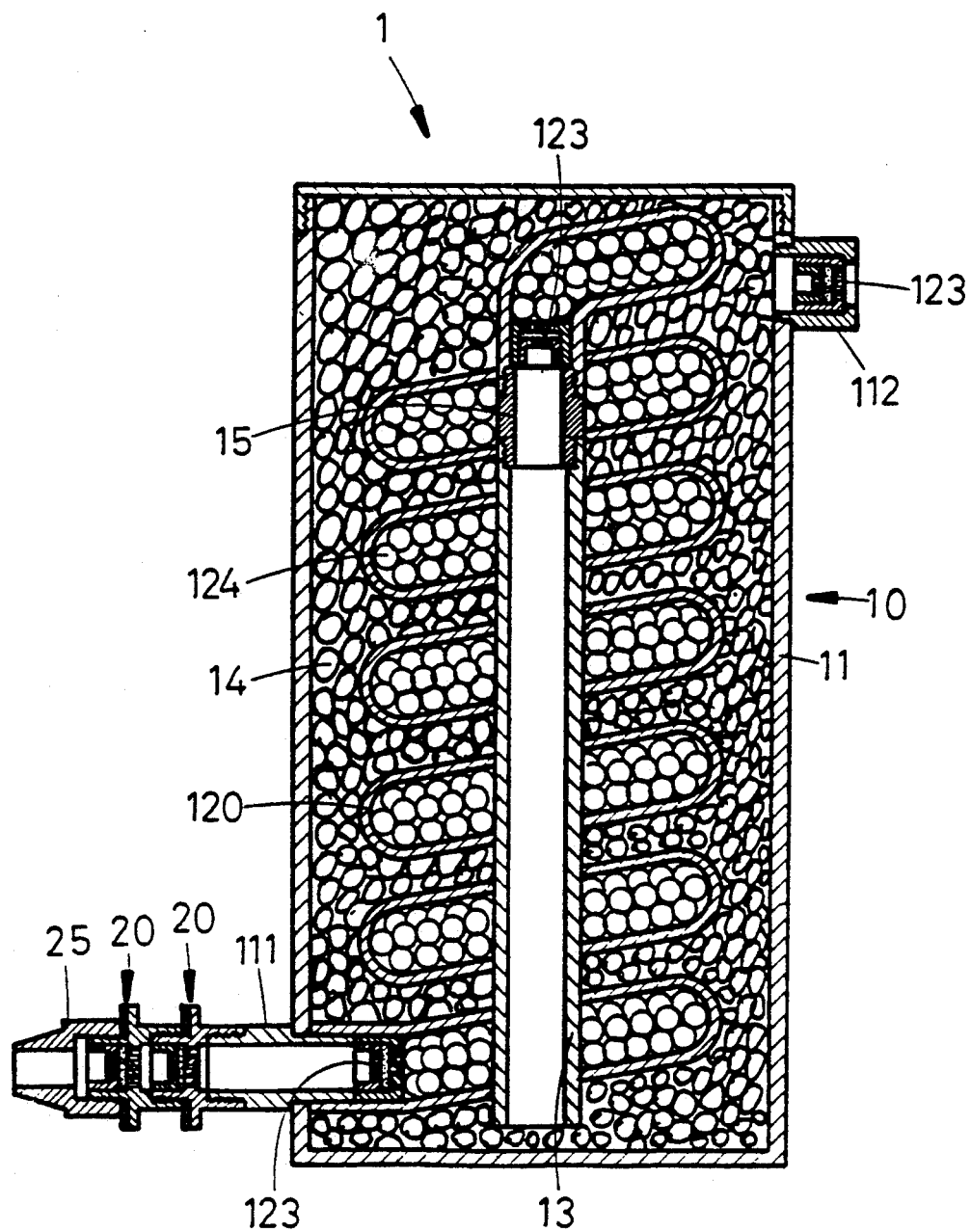
FIG. 1 shows a longitudinal section view of the first embodiment of the present invention.
Figure 2:
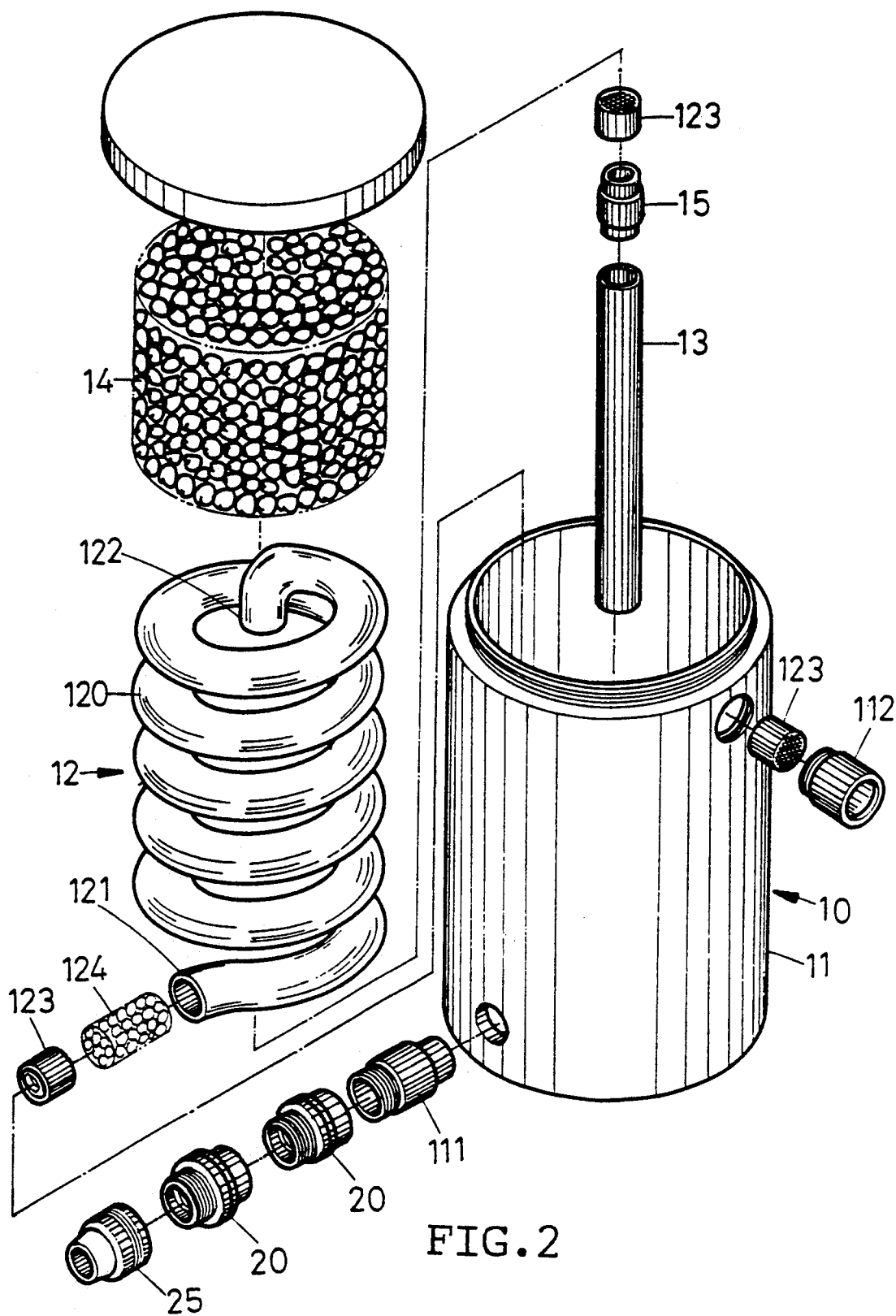
FIG. 2 shows a breakdown view of the first embodiment of the present invention.
Figure 3:
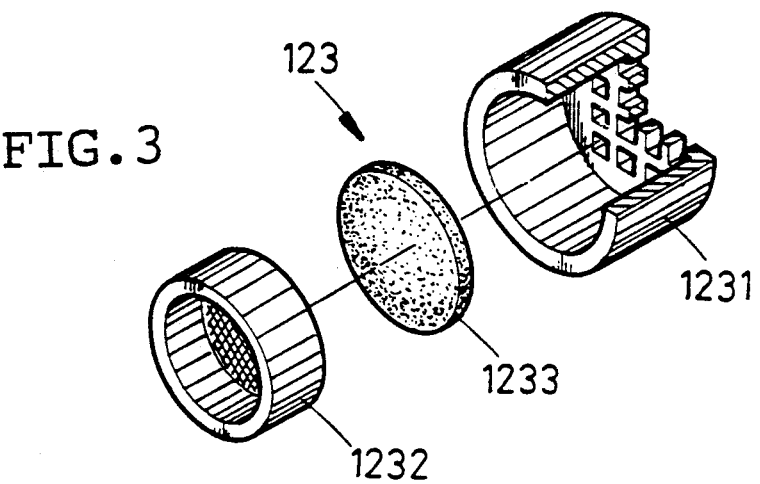
FIG. 3 shows a breakdown view of filter leaf jacket of the first embodiment of the present invention.
Figure 4:
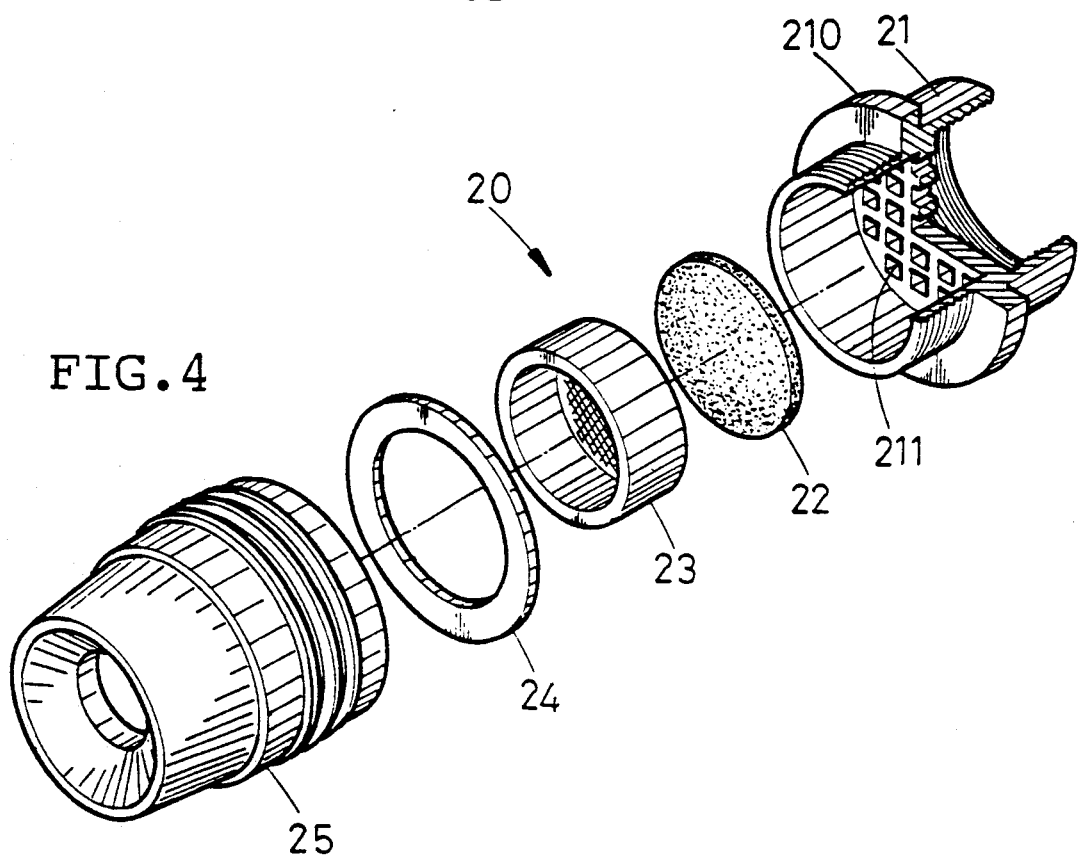
FIG. 4 shows a breakdown view of filter leaf thimble of the first embodiment of the present invention.

As shown in FIG. 1 and 2, a water filter 1 comprises a water filter cylinder 10 and a plurality of filter leaf thimbles 20, wherein the water filter cylinder 10 primarily consists of a housing 11, a rotary filter tube 12, a leading flow tube 13 and a plurality of active carbon 14. The bottom side of housing 11 is provided with a water inlet pipe 111, and the top side of housing 11 is provided with a water outlet pipe 112, and a filter leaf jacket 123 is installed in the water inlet pipe 111 and water outlet pipe 112 respectively. A filter leaf jacket 123 is provided to the inner edge of two ends 121, 12 of tube body 120 of rotary filter tube 12 respectively, and the space between two filter leaf jackets 123 in the tube body 120 is filled with ion-exchange resin 124. As shown in FIG. 3, the filter leaf jacket 123 consists of a non-woven cloth 1233 sandwiched between two net jackets 1231, 1232. One end 121 of tube body 120 is connected to the outer edge of inner end of water inlet pipe 111 of housing 11. Another end 122 of tube body 120 is connected to the outer edge of one end of thimble 15. The outer edge of another end of thimble 15 is connected to the inner edge of one end of leading flow tube 13. The leading flow tube 13 is an empty tube. Another end of leading flow tube 13 is extended to the bottom of housing 11. The interior of housing 11 and the periphery of rotary filter tube 12 and leading flow tube 13 are filled with active carbon 14. The outer edge of outer end of water inlet pipe 111 is connected to two filter leaf thimbles 20 which are mutually nested or screwed together. As shown in FIG. 4, the filter leaf thimble 20 consists of a tube body 21, a non-woven cloth filter leaf 22, a net jacket 23 and a washer 24. The inner edge of one end of tube body 21 is provided with a thread, the outer edge of another end of tube body 21 is provided with a corresponding thread and a protruding ring 210. The outer side of protruding ring 210 is provided with the washer 24. A net frame 211 is installed in the tube body 21. The non-woven cloth filter leaf 22 is installed in the net frame 211 The net jacket 23 is installed on the outer side of non-woven cloth filter leaf 22. The rear end of filter leaf thimble 20 is connected to a jacket 25 which is made of synthetic rubber and elastic and tensile in favor of being applied into a water faucet or other water source (not shown in the drawings).

The drinking water flows from a water pipe to the rotary filter tube 12 and larger solid impurity in water is filtered through two filter leaf thimbles 20, and then smaller impurity in said water is eliminated through the ion-exchange resin 124 in the rotary filter tube 12, then flows into the leading flow tube 13, and flows to the bottom of housing 11 through the leading flow tube 13 and is further purified by the active carbon 14 filled in the housing 11 and around the rotary filter tube 12 and leading flow tube 13 to continuously adhere to the residual smaller impurity in water, and clean drinking water is rising up to be further filtered through the filter leaf jacket 123 in the water outlet pipe 112 and drained from the water outlet pipe 112.

Second Embodiment

Figure 5:
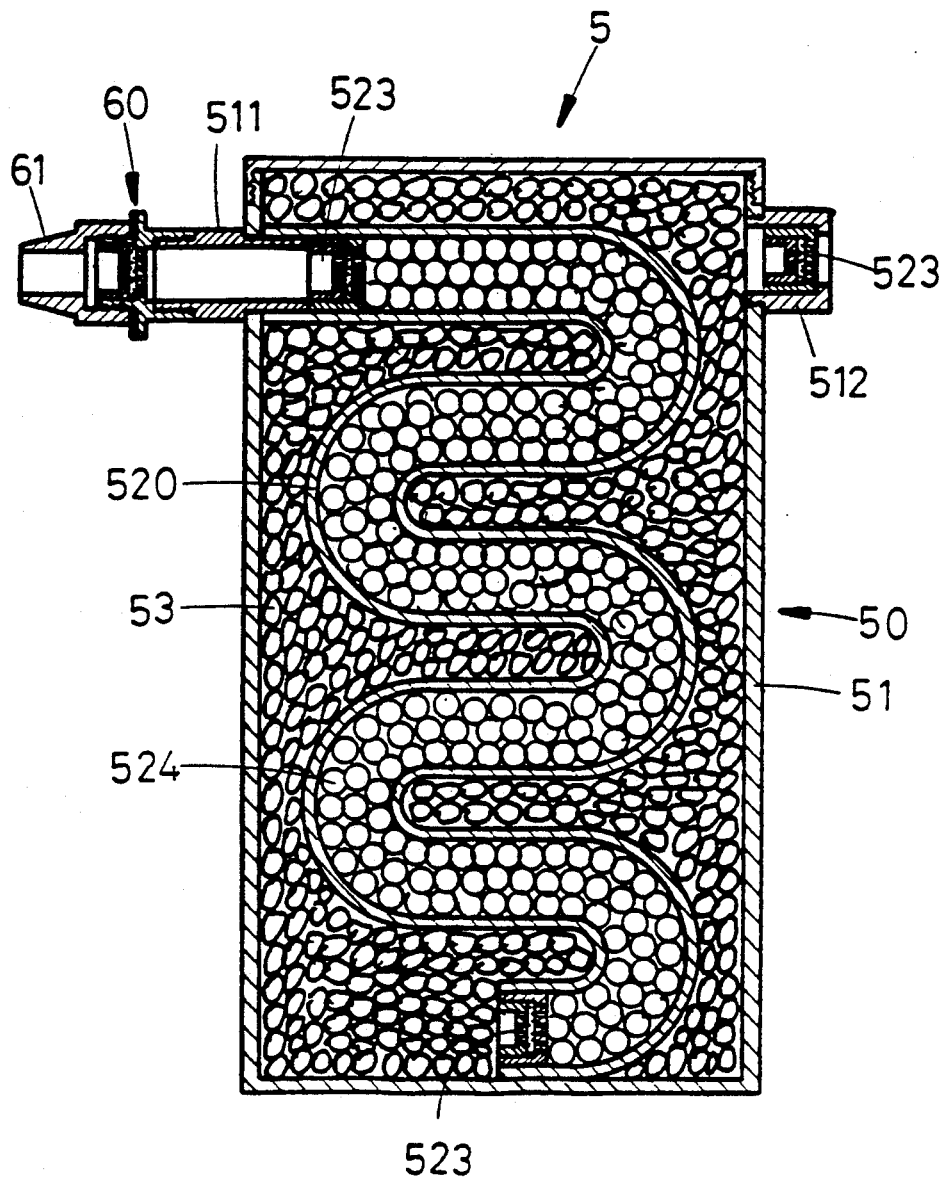
FIG. 5 shows a longitudinal section view of the second embodiment of the present invention.
Figure 6:
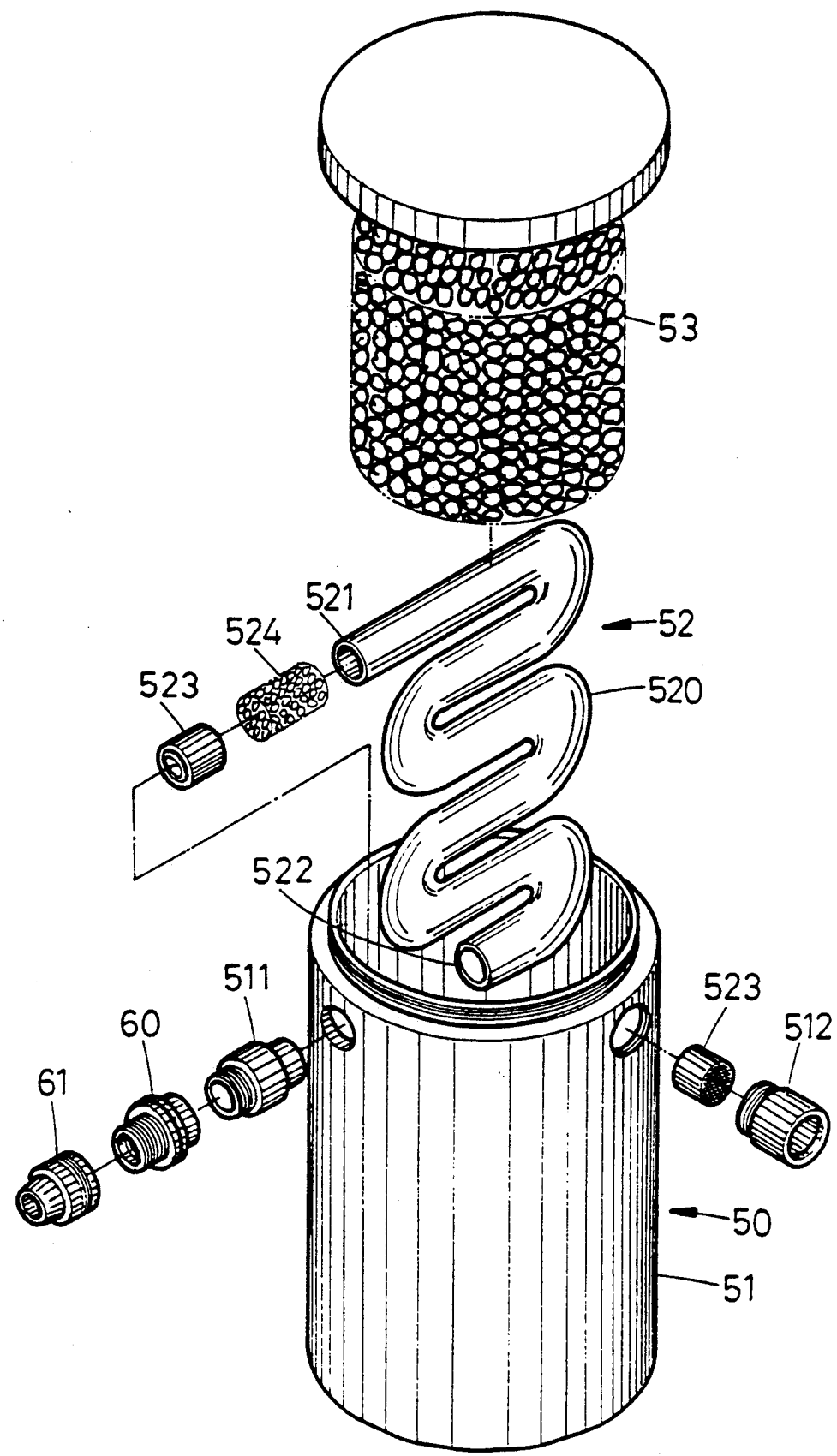
FIG. 6 shows a breakdown view of the second embodiment of the present invention.

As shown in FIG. 5 and 6, a water filter 5 comprises a water filter cylinder 50 and a filter leaf thimble 60, wherein the water filter cylinder 50 consists primarily of a housing 51, a rotary filter tube 52 and a plurality of active carbon 53. A water inlet pipe 511 is provided to one side of the housing 51, and a water outlet pipe 512 is provided to another side of the housing 51, and a filter leaf jacket 523 is installed in the water inlet pipe 511 and water outlet pipe 512 respectively. As shown in FIG. 6, a tube body 520 of the rotary filter tube 52 is shaped as a snake, inner edge of two ends 521, 522 of the tube body 520 is provided with the filter leaf jacket 523 respectively. The space between two filter leaf jackets 523 in the tube body 520 is filled with ion-exchange resin 524. One end 521 of tube body 520 is connected to the outer edge of inner end of water inlet pipe 511 of housing 51. Another end 522 of tube body 520 is extended to the bottom of housing 51. The interior of housing 51 and the periphery of rotary filter tube 52 are filled with active carbon 53. The outer edge of outer end of water inlet pipe 511 is connected to a filter leaf thimble 60. The rear end of filter leaf thimble 60 is screwed to a jacket 61 in favor of being applied into a water faucet or other water source (not shown in the drawings).

The second embodiment is a simplified type of the first embodiment, so a filter leaf thimble and a leading flow tube are omitted. The rotary filter tube of second embodiment is shaped as a snake. The function and effectiveness of two embodiments are all the same.

The larger solid impurity in the drinking water is firstly filtered by the filter leaf thimble but the accumulation of said impurity for a long time will quickly block the non-woven cloth filter leaf in the filter leaf thimble. Since the filter leaf thimble is connected to the outer end of water inlet pipe, it is very quick and convenient to replace said non-woven cloth filter leaf or thimble. The rotary filter tube is rotated in the housing to form a long filter course so that the filter material (ion-exchange resin or active carbon) in the rotary filter tube has enough time to adhere to the smaller impurity in the water to become clean water which is further purified by the active carbon (or ion-exchange resin) in the housing and around the rotary filter tube and then drained from the water outlet pipe. Therefore, the primary advantage of present invention is the longest filter course in a certain filter space for filtering drinking water.

While the invention has been described substantially with reference to specific embodiments thereof, it will be understood that changes and modifications may be made in the structure described and illustrated without departing from the spirit of the invention or exceeding the scope of the claims.

What is claimed is:

1. A water filter comprising a water filter cylinder and a plurality of filter leaf thimbles, wherein the water filter cylinder includes a housing with water inlet and outlet pipes disposed oppositely from one another on the housing and a rotary filter tube filled with a first filter material, one end of the rotary filter tube being connected to the water inlet pipe, and another end of the rotary filter tube being disposed oppositely in said housing from the water inlet pipe, said rotary filter tube being surrounded by a second filter material which fills the housing of the water filter cylinder, the water inlet pipe being connectable to more than one of said filter leaf thimbles.

2. A water filter as claimed in claim 1, wherein the rotary filter tube comprises a windable and bendable filter tube, and wherein the filter cylinder further comprises two filter leaf jackets, the tube body of said rotary filter tube being filled with said first filter material, and each of said filter leaf jackets being disposed at an end of said tube body, said rotary filter tube being bendably wound in the housing.

3. A water filter as claimed in claim 1, wherein at least one of the filter leaf thimbles comprises a tubular body having first and second ends, a non-woven cloth filter leaf, a net jacket and a washer, the inside surface of said first end of the tubular body being threaded, the outside surface of said second end of the tubular body also being threaded, said tubular body further comprising a protruding ring which circumferentially surrounds said tubular body and bears against said washer, said washer being disposed circumferentially around said second end, a net frame and said net jacket being installed in the tubular body such that the non-woven cloth filter leaf is sandwiched between the net frame and the net jacket, said first end being capable of threadedly engaging either a second end of another tubular body or the water outlet pipe of the housing, said second end of the tubular body being capable of threadedly engaging a jacket other than said net jacket.

4. A water filter as claimed in claim 1, wherein said first and second filter materials are the same.

5. A water filter as claimed in claim 1, wherein said first and second filter materials are not the same.

6. A water filter as claimed in claim 1, wherein at least one of said first and second filter materials is activated carbon.

7. A water filter as claimed in claim 1, wherein at least one of said first and second filter materials is an ion-exchange material.

* * * * *